United States Patent
Elberbaum

(10) Patent No.: US 8,441,824 B2
(45) Date of Patent: May 14, 2013

(54) METHOD AND APPARATUS FOR REGULATING AC-DC ADAPTOR FOR LOW CURRENT DRAIN

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 382 days.

(21) Appl. No.: 12/945,125

(22) Filed: Nov. 12, 2010

(65) Prior Publication Data

US 2012/0120700 A1    May 17, 2012

(51) Int. Cl.
    *H02M 7/155*    (2006.01)
(52) U.S. Cl.
    USPC .......................................... 363/128; 363/125
(58) Field of Classification Search .............. 363/52–54, 363/84, 85, 125, 128
    See application file for complete search history.

(56) References Cited

U.S. PATENT DOCUMENTS

| | | | | |
|---|---|---|---|---|
| 3,987,356 | A | * | 10/1976 | Steigerwald ..................... 363/44 |
| 4,733,102 | A | * | 3/1988 | Nakayama et al. ............ 307/107 |
| 6,275,011 | B1 | * | 8/2001 | Yang .............................. 320/150 |

* cited by examiner

*Primary Examiner* — Matthew Nguyen
(74) *Attorney, Agent, or Firm* — Katten Muchin Rosenman LLP

(57) ABSTRACT

A method and apparatus for controlling the feed rate of a rectified AC pulses via a gated rectifier in a low DC voltage and current power supply is disclosed. The gated rectifier outputs gated AC pulses to an input capacitor via a current control diode and/or a zener diode and/or a resistor for charging the input capacitor to a voltage level and a charge capacity commensurate with the low voltage regulator and the low DC current drain. A gate capacitor for accumulating incremental charges of rectified AC pulses fed via a divider network is pre-configured to trigger the gated rectifier, timed by discharging the aggregated charge of a predetermined number of charges to the gate. The input capacitor charged by the gated AC pulses at a rate of one per said determined number to the input capacitor feeds the voltage regulator for powering a low DC current consuming device.

20 Claims, 4 Drawing Sheets

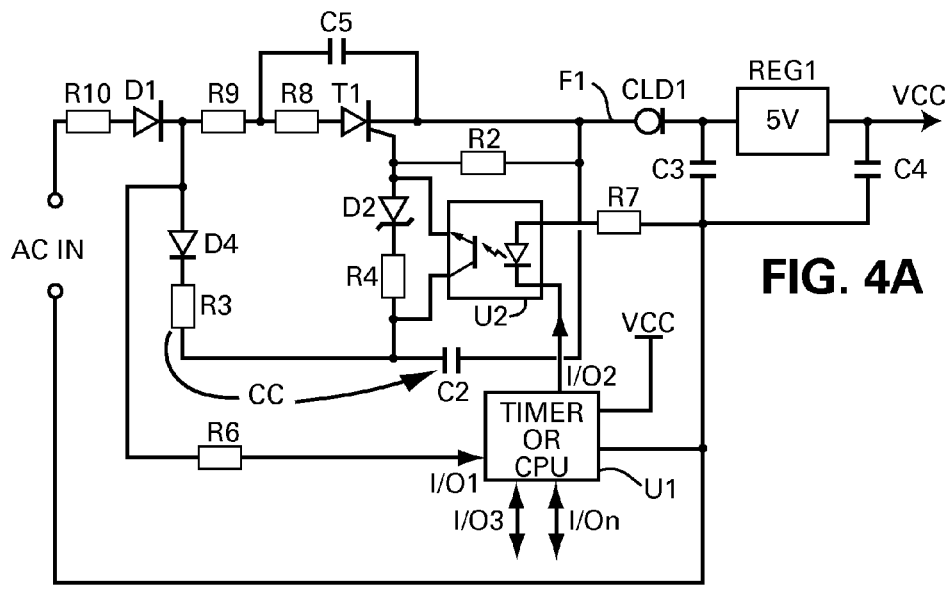
FIG. 4A
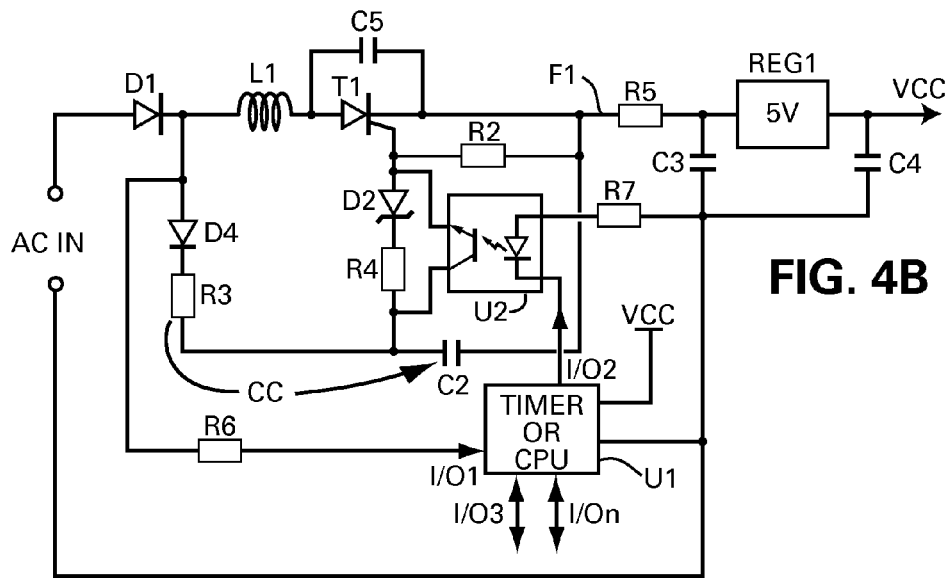
FIG. 4B
FIG. 5A
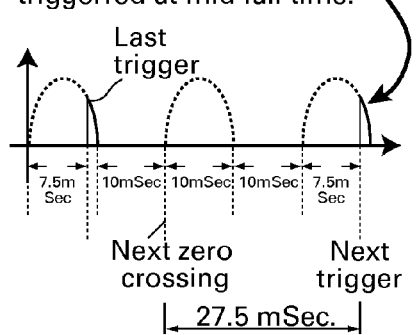
One out of two half wave pulses triggerred at mid fall time.
FIG. 5B
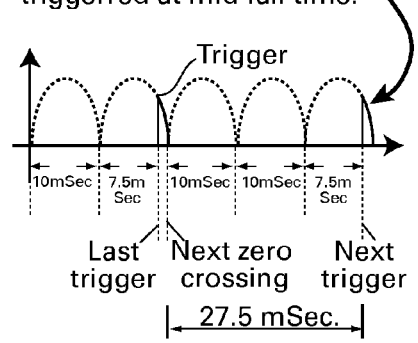
One out of three full wave pulses triggerred at mid fall time.

METHOD AND APPARATUS FOR REGULATING AC-DC ADAPTOR FOR LOW CURRENT DRAIN

FIELD OF THE INVENTION

AC to DC adaptors and power supplies used for home automation and communication devices.

BACKGROUND OF THE INVENTION

Many different electrical devices installed within the electrical system of premises, such as residence, office, businesses, factories, public buildings and similar require DC power to be supplied to the device.

Devices such as LED light controllers, automated switches, power outlets including environment control devices such as controls for heating, cooling, window shades, curtains as well as AC power feed to home automation appliances that are inside electrical boxes embedded into the wall cannot be fed by a separate low voltage DC power. This is because the electrical and building codes, correctly prohibits the mingling of low voltage wires with wall mounted AC power devices and power lines in conduits.

This mandates the use of AC to DC adaptors or power supplies internally built inside the small electrical outlets, switches, dimmers and the like. Such adaptors use AC transformers that are bulky and costly or power switching regulators that are costly and generate noise that must be suppressed.

Analog methods and devices to convert AC power to a low voltage and low current DC power are simple and generate very little noise, yet analog regulators waste unnecessary power and the resulting heat must be dissipated. The wasted energy by the analog regulator is far above the actual energy needed to power a given device to operate, particularly when the device itself consumes very low power of few mW, or current of few mA and a low voltage such as 5V DC for its operation. Such low power consuming devices including dimmers, current sensors and similar devices, using low power consuming CPU are disclosed in a U.S. Pat. No. 7,639, 907 and U.S. patent application Ser. No. 12/236,656 filed on Sep. 24, 2008, U.S. patent application Ser. No. 12/484,321 filed on Jun. 15, 2009, U.S. patent application Ser. No. 12/614,468 filed on Nov. 9, 2009, U.S. patent application Ser. No. 12/725,808 filed on Mar. 17, 2010 and U.S. patent application Ser. No. 12/761,484 filed on Apr. 16, 2010 and are incorporated herewith by reference and are referred to hereafter as the reference patents and applications. A new small size low cost analog AC to DC adaptor or power supply with lower wasted energy and lower heat dissipation is needed.

SUMMARY OF THE INVENTION

AC power supply or AC to DC power adaptor use a well known bridge rectifiers or a single diode rectifier to rectify the AC current into a train of positive (or negative) halves of the AC sinusoidal curves, also known as sine wave. The one rectified half sinusoidal curve or each of the two halves of the full wave rectified sinusoidal curve is termed hereafter as a rectified positive AC pulse. Whenever the term AC pulse or rectified AC pulse is used it refers to a rectified positive AC pulse, or a part of the positive portion of the sine wave curve.

It should be understood however, that whatever is said and claimed hereafter is not limited to a positive low DC voltage regulator. It covers both a positive DC voltage and a negative DC voltage regulators that are attained by a simple reversal of the diodes and the thyristor. The use of the term rectified positive AC pulse is only for simplifying the explanations hereafter.

The term positive going zero crossing or zero crossing by itself refers to the point in which the AC power reaches or crosses the zero line from negative to positive.

The term negative going zero crossing hereafter refers to the point in which the AC power reaches or crosses the zero line from its positive cycle.

The full wave rectified AC pattern of the US 60 Hz is a train of 120 AC pulses per sec. or double the power line frequency, while the half wave rectified AC pattern is a train of 60 AC pulses with 60 half cycle spaces ($t=\frac{1}{120}$ sec.), one in between each two adjacent AC pulses. As will be explained later, the output DC average voltage of the full wave rectifier is double the output DC average voltage of the half wave rectifier and for this reason, the use of half wave rectifier is preferred because the energy wasted is far less for a low power consuming AC devices.

Moreover, if for example, only one AC pulse out of two AC pulses outputted from the half wave rectifier is fed to the voltage regulator circuit of the AC adaptor, the DC output average voltage of such one out of two pulses will be again the half average of the half wave rectified DC voltage, from which we learn that for low power consuming devices, the feeding or passing to the voltage regulator circuit only few AC pulses from the pulse train will result in a more efficient AC power adaptor, with less wasted energy and lower heat generation that need to be dissipated. Accordingly one object of the present invention is the circuit for feeding or passing a predetermined number of AC pulses from the AC pulse train to the regulating circuit of the AC adaptor.

The circuit for passing the predetermined number of AC pulses uses a thyristor having its gate connected to a pulse integrator, calculated such that a given "n" number of pulses will incrementally charge a trigger or gate capacitor to an aggregated trigger on level for triggering the thyristor to on state for passing a single rectified AC pulse through it.

The rectified AC pulses passing through the thyristor are therefore distanced by time equal to an accumulative time it takes for the n rectified AC pulses to charge the gate capacitor to the aggregated trigger on level. In the case of 60 Hz of the US power line, the time separating each of the half wave rectified AC pulses is 16.6 mSec. and when one out of three pulses, for example is made to pass, the aggregated time delay between the passing rectified AC pulses will be 50 mSec., or the rectified AC pulses will pass the thyristor at a rate of 20 pulses per second. Feeding one out of three rectified AC pluses will reduce the average DC voltage to one third of the half wave rectifier average, or one sixth of the average DC output voltage of the full wave rectifier.

Feeding 20 AC rectified pulses to a large capacitor with a capacity to accumulate and maintain or buffer sufficient charge (including the over voltage) needed for regulating the DC voltage for the low current consuming devices is practical, but it calls for a solution to the high peak voltage of the AC rectified pulses. This as will be explained later is another object of the present invention.

The other object of the present invention is a circuit that controls the energy or the current fed from the thyristor to the capacitor for accumulating the electric charges of the rectified AC pulses at the input side of a well known analog regulating circuit.

The charge accumulating capacitor, termed hereafter as the input capacitor, can be any well known electrolytic or tantalum capacitor with sufficient capacity to store or buffer the electric charges needed to operate the above described low power consumed AC device, or any other low power consuming DC operating devices.

The capacitance value of the input capacitor and the suppression of the high voltage peaks of the AC rectified pulses and the limiting of the input capacitor charge current is achieved by using a well known current limiting diodes in combinations with zener diodes and resistors which are explained later.

Another object of the preferred embodiment of the present invention is the use of discrete elements and components, so that the AC adaptor circuit itself will operate without stabilized or regulated DC power. This is because the AC adaptor cannot power DC fed circuits initially when the AC power is applied or restored, i.e., when the AC is cut and restored.

Yet another object of the present invention is to include a DC powered timing and control circuit for generating precise gate timing when the DC power is regulated and applied to the device. In other words the start-on circuit remains the trigger delay circuit explained above, to be replaced immediately after with a precise timing circuit when the initial DC output is settled and a regulated DC is fed to the timing and control circuit.

BRIEF DESCRIPTION OF THE DRAWINGS

FIG. 4A is another circuit diagram of the AC adaptor or power supply including a trigger timer or CPU and R-C noise filter of the other preferred embodiment of the present invention.

FIG. 4B is a modified circuit diagram of FIG. 4A by replacing the R-C with L-C noise filter.

FIG. 5A is a graph showing a delay trigger timing of half wave rectified AC pulses.

FIG. 5B is a graph showing a delay trigger timing of full wave rectified AC pulses.

DETAILED DESCRIPTION OF THE PREFERRED EMBODIMENTS

Figure 1A:
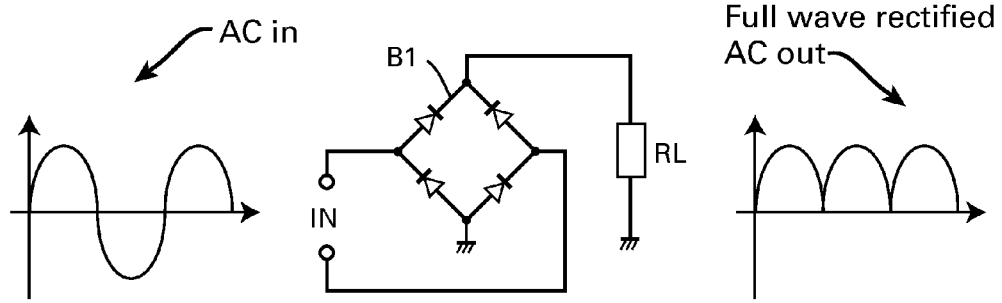
FIG. 1A shows the well known bridge rectifier circuit and its full wave sinusoidal curve output.

The average rectified DC output voltage of the full wave rectifier shown in FIG. 1A is calculated by the equation;

Vdc=2×Vpeak÷π and the RMS voltage of the rectified AC pulse is calculated by the equation;

$$Vrms = Vpeak\left(1 - \frac{1}{e}\right),$$

where e=2.71828, or Vrms~Vpeak×0.63.

Figure 1B:
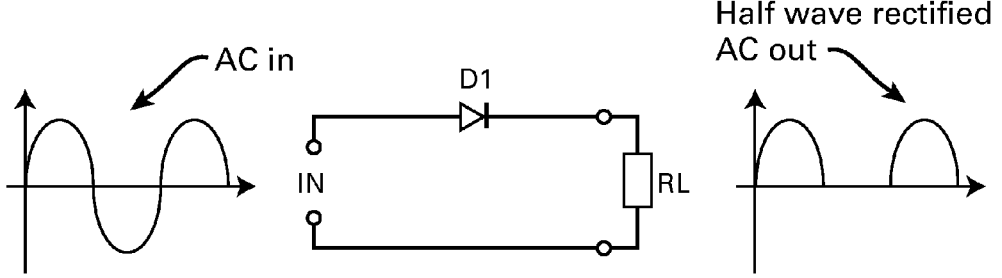
FIG. 1B shows the well known diode rectifier circuit and its half wave sinusoidal curve output.

The average rectified DC output voltage of the well known half wave rectifier shown in FIG. 1B is calculated by the equation;

Vdc=Vpeak÷π and the RMS voltage of the rectified AC pulse is calculated by the equation;

$$Vrms = Vpeak \div 2$$

From the above equations we learn that the average DC voltage Vdc of the half wave rectifier is half of the average DC output voltage of the full wave rectifier. A note, the rectifier junction loss via the half wave rectifier is approximately 0.7V, such minor loss is insignificant when considering the rectifying of AC 120V of the US or the AC 230V of the European power lines. The 0.7V loss is therefore ignored in the following descriptions.

The Vpeak rectified AC voltage pulse is calculated by the equation:

Vpeak=√2×Vrms, where the Vrms is the 120V of the US power line or the 230V of the European power line.

From the above well known equations we learn that the output average DC voltage of 120V AC full wave rectifier (2×Vpeak÷π) will be approx.:

$$2 \times 120 \times \sqrt{2} \div \pi \sim 108V \text{ DC and}$$

the output average DC voltage from 120V AC half wave rectifier (Vpeak÷π) will be approx.: 120×√2÷π~54V DC i.e., half of the average DC output voltage of the full wave rectifier. This makes it clear that the power loses by an analog AC adaptor, feeding regulated power to a low power consuming device, such as operating on 5V DC and consuming 10 mA of current, the half wave rectifier will be more energy efficient and requiring less heat dissipation.

The practical power calculation equation for a full wave rectification of one cycle of the 50 Hz or 60 Hz of the power line is:

$$P\text{time averaged} = \frac{V^2 rms}{R} \text{ and,}$$

in the case of half wave rectifier the time based equation is:

$$P(t) = \frac{V^2(t)}{R},$$

accordingly the practical calculation for half wave rectifier which time(t) is half and the one cycle time and the practical equation will be:

$$P(\text{half time averaged}) \simeq \frac{V^2 rms}{2R}.$$

From here it become clear that each AC pulse we select and feed to the regulator will be equal to $$\frac{V^2\text{rms}}{2R} \times \frac{1}{60}$$

Another simplified practical calculation for the power fed to the input capacitor will be $$\frac{V^2\text{rms}}{R} \times \frac{n}{100} \text{ or } \frac{n}{120}$$

wherein the n pulses are the rate or the number of passing AC pulses from the thyristor to the input capacitor divided by 100 or 120 rectified AC pulses, wherein the 100 AC pulses are for calculating the European 50 Hz full wave rectifier and the 120 AC pulses are for the 60 Hz of the US full wave rectifier.

Based on the calculation explained above the power consumption during one half wave AC rectified pulse will be $$\frac{V^2\text{rms}}{R} \times \frac{1}{120}.$$

However, the power consumption calculation is based on fix current load such as a resistor. The 10 mA current drain of the load device of the above example is DC. The rectified AC pulses passing through a rectifier are fed to a large charge capacitor with varying currents, phase shifts and it must be calculated using a power factor of 0.5~0.65. Very small power supplies should be calculated on a worst case basis for example, for a current drain of 10 mA the resistance in 120V line is 12,000Ω

$$\left(\frac{V\text{rms}}{\text{mA}} \text{ or } \frac{120 \text{ V}}{10 \text{ mA}}\right).$$

The power consumption is $$\frac{120^2}{12000\Omega} = 1.2 \text{ W}.$$

However for worse case power factor calculation (0.55) the power consumption is $$\frac{1.2 \text{ W}}{0.55} = 2.18 \text{ W}.$$

Considering that the device DC power consumption is 5V×10 mA=50 mW, the energy loses will be well over 97%.

Figure 1C:
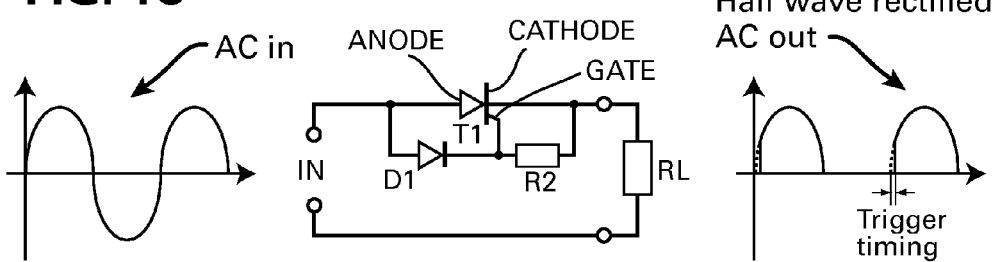
FIG. 1C shows a well known half wave rectifier circuit diagram for using well known thyristor.
Figure 1D:
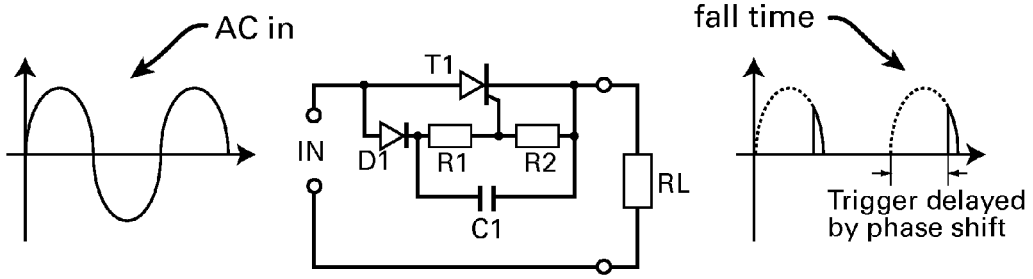
FIG. 1D shows another well known half wave rectifier circuit shown in FIG. 1C with the addition of voltage divider and phase shift capacitor to set up trigger timing at the fall time slop of the rectified AC pulse.

FIGS. 1C and 1D show a gated rectifier circuit. The term gated rectifier comprising the well known thyristor, Silicon Controlled Rectifier or SCR and Triac includes also gated semiconductor devices such as uni junction transistor, FET and others. The term thyristor is used hereafter in lieu of gated rectifier to cover, as the case maybe, any type of gated rectifier or gated semiconductor.

The thyristor is a solid-state semiconductor device with four alternating N and P type layers acting as bistable switches, made to conductor switch on by a trigger current pulse and continue to conduct as long as the thyristor is forward biased until the voltage across the thyristor reverses its polarity, that is—when the sinusoidal AC power shown in FIGS. 1C and 1D fed to the thyristor reaches or crosses the zero line into the negative side of the sinusoidal curve.

A small current of 1 mA or less fed from the shown diode D1 to the gate terminal, which is tied to the chatode via R2 and a voltage level below 1V to switch on the silicon junction is generally sufficient to switch on a 1.0 A type thyristor. Accordingly the shown rectifier circuit in FIG. 1C will be triggered at the initial rise of each positive sinusoidal curve, enabling the thyristor of the half wave rectifying circuit to operate as a common rectifying diode. The shown initial rise of the rectified AC pulse is a sharp rise representing the initial triggering point or the minute delay in switching on the thyristor.

Once the thyristor is triggered and is conducting the gate potential rises with the chatode output and is no longer active. As the AC power reverses its polarity the thyristor switches off, to switch on again with the next positive going sinusoidal AC curve fed to it.

It is possible and common to add a resistor in series (such as R1 shown in FIG. 1D) with the diode D1 to form a voltage divider with R2 for delaying the trigger timing and cut a portion of the rising curve of the outputted rectified AC pulse. This delay is achieved by raising the needed trigger voltage level fed via the voltage divider (R1/R2) to the gate terminal. Because of the rising sinusoidal curve (the rising of the trigger voltage level is time based) it is equal to the delaying of the trigger timing.

However, such voltage divider must be pre-configured, calculated and designed to surpass the trigger voltage during the rising portion of the positive sinusoidal curve. If the divider design will not reach the gate trigger voltage all the way to the peak level of the sinusoidal curve, no triggering will take place and the thyristor will not switch on.

There is an advantage to switch on or trigger the thyristor during the fall time of the positive AC sinusoidal curve because such delayed triggering, in addition to reducing the average DC voltage level, it cuts the peak voltage level and eliminates the most of the power waste and heat due to high peak voltage. Accordingly it is possible to trigger the thyristor during the fall edge of the positive sinusoidal curve by using a phase shift capacitor C1 shown in FIG. 1D. Such AC power line capacitor for shifting low frequency phase are large in size, while offering limited accuracy and therefore are not practical for a small size power supply.

In practice the triggering mid way for passing rectified AC pulse, or timing the trigger to coincide with high voltage levels of the rectified AC pulse, causes high electrical noise that requires substantial suppression and filtering and are not used.

The difficulties involved with filtering, or phase shifting mid way triggering, or triggering during the fall of the positive AC sinusoidal curve is that the low frequencies of 50 or 60 Hz of the power line mandates the use of large size filters and capacitors and moreover the capacitors must be made to sustain the high peak voltages such as 170V (peak) for the US power line or the 325V (peak) of the European power line. Such parts are bulky and thus cannot be used inside small AC powered device such as the wall mounted AC devices including AC outlets and switches that incorporate, for example current sensors, current status communicators and optical receivers-transmitters that are disclosed in the reference patents and patents applications.

Other well known circuits to switch on or trigger the thyristor with a precise programmed time delay use timing and drive circuits, but such timing circuits require DC power to operate, while the preferred embodiment of the present invention calls for operating the thyristor circuit with discrete non DC powered devices. The control by DC operated circuits are explained later.

Figure 2A:
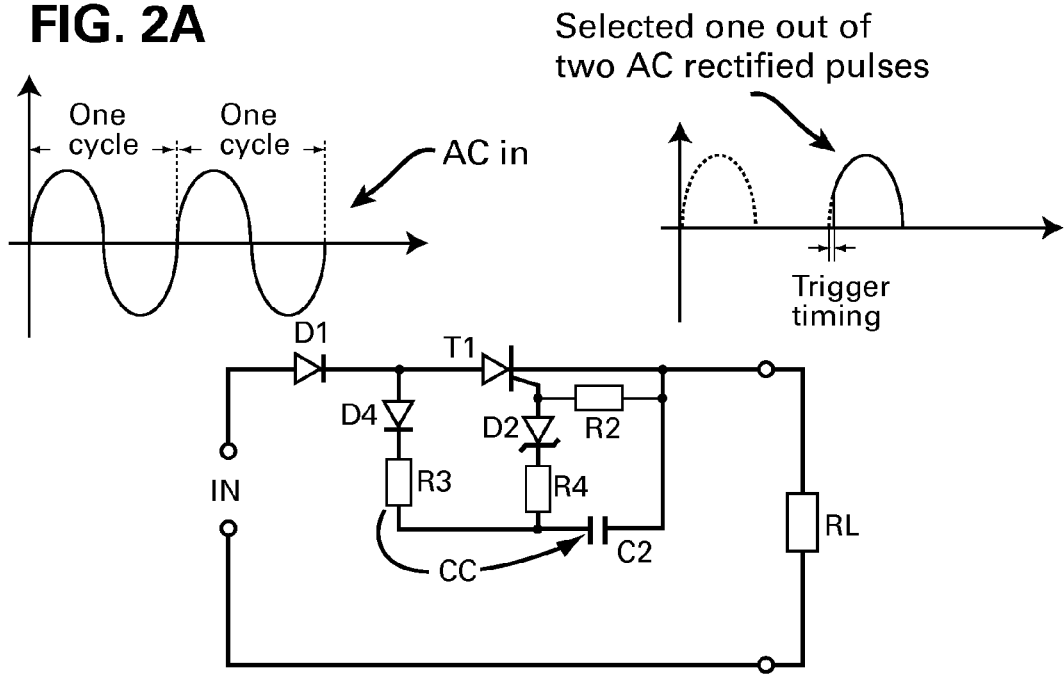
FIG. 2A is a preferred embodiment of a conceptual circuit diagram for delaying a trigger pulse for passing n number of AC rectified pulses via a well known thyristor.

FIG. 2A shows the trigger circuit of the preferred embodiment of the present invention comprising T1, D1, D4, R3, R4, R5 and C2 wherein R3 and C2 are calculated to have time constant substantially longer than the 10 mSec. (Europe) or the 8.3 mSec. (US) of the AC rectified pulse width, such that the capacitor C2 will be charged by the current CC fed from D1 and D4, but to a level below the zener D2 voltage. D4 shown in FIGS. 2A~4B purpose is to prevent a discharge of the capacitor C2 during the negative cycle of the AC power.

In other words, a single rectified AC pulse will not charge the capacitor C2 to a level that can trigger the thyristor T1 gate. For example, when R3 is 330KΩ and C2 is a 0.2 μF capacitor the time constant to charge C2 is $33 \cdot 10^4 \cdot 2 \cdot 10^{-7} = 66 \cdot 10^3$ or 66 mSec. i.e., it will take 66 mSec. to charge the C2 capacitor to the average DC level of 54V referred to above.

However because the rectified pulse width is only 8.3 or 10 mSec. the charge level will be only a small portion of the rising curve of the rectified AC pulse, resulting in a charge of a far lower voltage level, below the zener voltage, therefore the first fed rectified AC pulse will not trigger the gate of the thyristor. Further, each succeeding rectified AC pulse fed to the trigger circuit via R3 will generate newly the current CC and incrementally increase the C2 voltage level. When the C2 aggregated voltage reaches the zener diode break down voltage it will discharge and trigger the gate terminal and will switch the thyristor into conducting state.

R2 and R4 and the reversed zener diode D2 are calculated to provided the gate voltage level and current within the specification as laid by the thyristor T1 manufacturer, while the values of R3, R4, C2 and D2 can be calculated and selected to trigger the thyristor with every other fed rectified AC pulse, i.e., by one out of two or by such as one out of three or by one out of n sequencing rectified AC pulses.

Figure 2B:
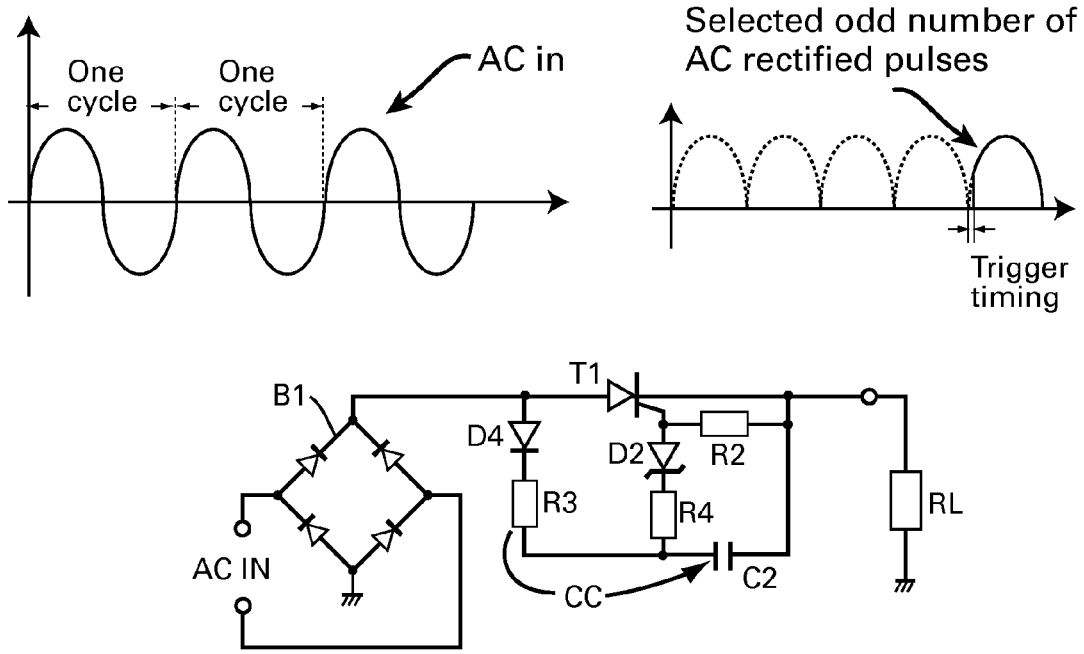
FIG. 2B is a modified circuit diagram shown in FIG. 2A to include bridge rectifier for passing odd number of AC rectified pulses.

The outputted rectified AC pulse from the half wave rectifier circuit shown in FIG. 2A is in fact equal to one out of two pulses of a full wave rectifier circuit shown in FIG. 2B. It can be simply said that each of the half wave rectified AC pulse is one of a pair and when the need is for odd number AC pulses, it is possible to use a full wave rectifier such as feeding one out of three full wave rectified AC pulses.

The circuit shown in FIG. 2B includes a similar trigger circuit to the trigger circuit of FIG. 2A with the exception that the thyristor and the trigger circuit are both fed from the bridge rectifier B1 enabling the circuit to output odd or pair n number of AC rectified pulses fed from the full wave bridge rectifier.

For simplifying the explanation and the claims the number of passing rectified AC pulses is also termed hereafter as the passing or feeding rate of pulses or the rate of rectified AC pulses.

Figure 3A:
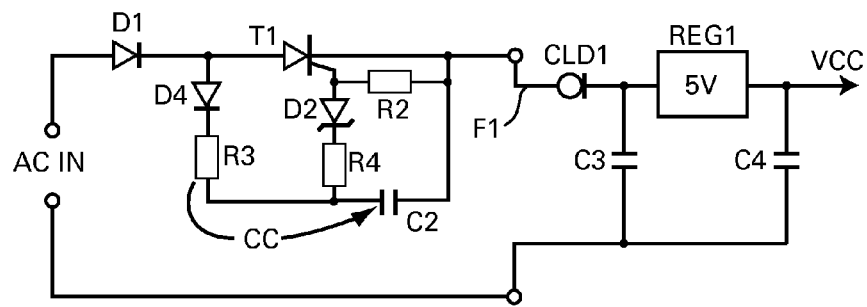
FIG. 3A is a circuit diagram of the preferred embodiment of the AC adaptor or power supply including the current limiting diode of the preferred embodiment of the present invention.

FIG. 3A shows the preferred embodiment of the AC adaptor or power supply including the input capacitor C3 for the rectified AC pulses fed from the thyristor T1 cathode via a current limiting diode or CLD, shown as CLD1 in FIG. 3A. The well known CLD, is also known as a "Current Regulating Diode" or a "Constant Current Diode". Unlike a zener diode that regulates specified voltage at a given current, the CLD limits or regulates the current at a specified current limit over a wide voltage range. The CLD acts as a dynamic resistor, changing its value along with the AC pulse fed through it.

To enable the example of 10 mA current drain for the AC device discussed above, the current feed to the input capacitor C3 has to be sufficient to charge the capacitor C3 to buffer a continuous drain of 10 mA. This mandates the charge of a current in excess, i.e., to store sufficient charge for buffering the continuous current drain. In one of the example above of feeding one out of two half wave rectified AC pulses, i.e., the one out four full wave rectified AC pulses, the need is to provide for charge current in excess of 40 mA.

The voltage of the accumulated charge in the input capacitor C3 should comply with the 5V analog regulator specifications by its manufacturer. Common analog voltage regulator requires a minimum of 3~5V above the regulated output voltage. This 3~5V also depends on the ripple level and therefore it can be anywhere in the range of 8~10V including ripple level of 1~3V for outputting a regulated 5V and the 10 mA current drain of the above suggested example.

Figure 3B:
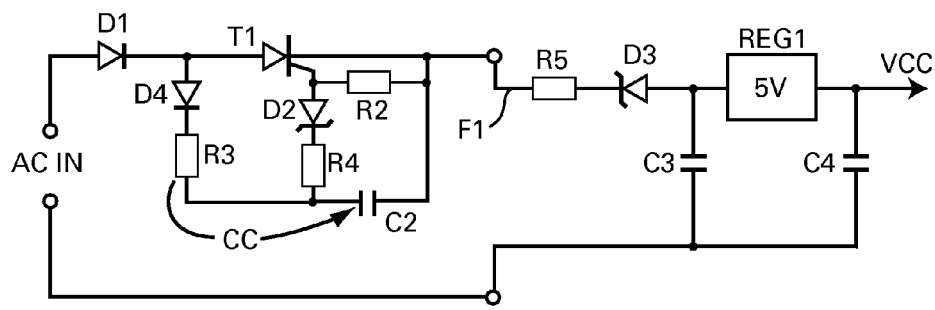
FIG. 3B is a circuit diagram of another embodiment of the regulating circuit in which the rectified AC pulses are fed to the input capacitor of the voltage regulator via resistor and zener diode.
Figure 3C:
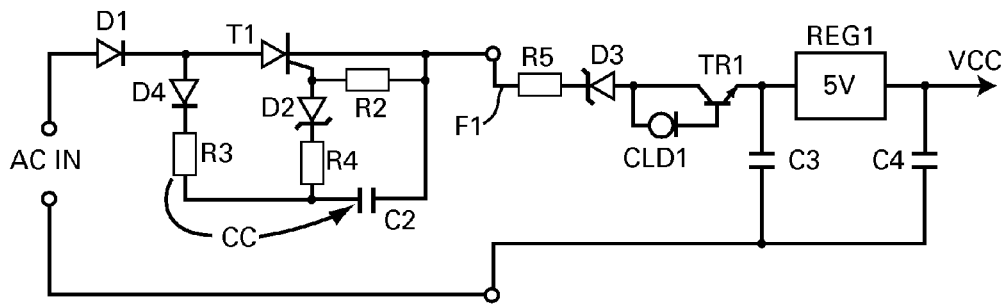
FIG. 3C is an expanded circuit diagram combining both the current limiting diode of FIG. 3A with the zener and the resistor of FIG. 3B.

The CLD selected in accordance with the CLD manufacturer specifications, such as Ishizuka Denshi of Japan or Central Semiconductors of the USA, may require parallely and/or serially connected CLDs or use the CLD to feed a base of a driver transistor TR1 shown in FIG. 3C to meet the specific current and voltage ranges within the AC adaptor or power supply design parameters.

The use of CLD is advantageous because of the dynamic resistance or impedance of the CLD, the value of which varies along with sinusoidal curve of the rectified AC pulse and thereby resulting in a lower loss or waste based on the average DC output versus a loss by a fixed serial resistor that should be calculated on the basis of the rectified AC pulse peak voltage, which will result in larger loss, waste and heat.

As explained above the average DC voltage for the 120V AC power of the US for one out of two half wave rectified AC pulses (one out four full wave rectifier) is approximately 27V, and as the final regulated DC in the example discussed above is 5V, it will be proper to state that by using the CLD the wasted power is the 22×40 mA drain, or 880 mW.

Even though the 880 mW is a substantial power loss on the basis of calculating the efficiency of the AC power supply, yet the clear energy saving by feeding limited rectified AC pulses into a fixed current load in combination with the CLD to the input capacitor C3 is substantial. More than 50% is saved when comparing to a conventional analog power supply. As shown in the calculation of the above example the power consumption of which was 2.18 W for a 120V AC power supply with 5V and 10 mA current drain DC output, while the outputting one out of two rectified AC pulses of an half wave rectifier combined with the CLD will consume only 880 mW, about 500, also because of a far better (0.8) factor calculation, by the use of resistive load and a fixed current.

Yet, the need for a specific DC output voltage and current drain along with the consideration for the AC line voltage such as 120V or 230V may require modifications to the circuit shown FIG. 3A. The AC adaptors or power supplies shown in FIGS. 3B and 3C are identical with the circuit shown in FIG. 3A with the exception of the circuit or line F1 feeding the input capacitor C3 with rectified AC pluses. Shown in FIG. 3A the feeding circuit F1 includes only current limiting diode CLD1. The CLD1 in the feeding or charge circuit or line F1 is replaced by a zener diode D3 in series with a resistor R5 in FIG. 3B. In FIG. 3C the charge circuit F1 includes four elements CLD1, a driver transistor TR1, zener D3 and the resistor R5.

The charge line or the feeding line F1 shown in FIGS. 3B and 3C are non exhaustive combination and values examples of the many voltages and current considerations for designing variety of regulated DC voltages with a low current drain, such as 24V DC with 3.0 mA drain, or 2.0V DC with 30 mA drain, or such as 3.3V with 1.5 mA drain that can well be designed to commensurate with the charge capacity needs by using any of the three feeding lines F1 shown in FIGS. 3A, 3B and 3C.

In the example of 230V AC the peak voltage is 325V and half wave average DC output is 104V and the average DC output of one out two half wave outputted rectified AC pulse is 52V. It is clear that the power waste consideration for a 1.5 mA current drain, a minute current drain, can use a resistor only instead of the CLD to handle the charge current to the input capacitor C3.

The other example of 30 mA current drain may require a driver transistor TR1 with its base current is controlled via a zener diode D3, along with the resistor R5 and the current limiting diode CLD1 limiting the peak voltages, the duration and the current the input capacitor C3 is charged via TR1. This is another example of the flexibility to design a practical and efficient low cost, small size and energy saving AC to DC rectifier and a regulator circuit. In practice the feeding of one out of two or one out of three half wave AC rectified pulses to the input capacitor C3 of the regulator REG1 in all the three circuit variations shown in FIGS. 3A, 3B and 3C, the Printed Circuit Board (PCB) size can be within a 250 mm$^2$ and the temperature rise of such encapsulated circuit can be less than 20° C. by careful design and selection of different combinations with optimum efficiency, heat, costs, size and reliability.

Further, the thyristor triggering position may shift in time due to temperature variations and/or capacitors value change over long periods. The shifting of the triggering time may cause a larger than the pre-configured or predetermined timing, in which case the trigger time may shift away from the zero crossing and trigger at a higher voltage point within the AC sinusoidal curve. A sharp rise at a higher voltage caused by a shifted trigger will generate noise levels beyond the allowed levels as required by the FCC of the US, or the CE requirements of Europe and will not comply with other standards by other countries.

Commonly such larger noises require large coils for suppressing/filtering the noise and a capacitor for shunting the noises across the power line or the noise source. However a small current drain such as 10-15 mA makes it possible to introduce one or two resistors instead of a large coil to filter the noise, for example two small ¼ W 270Ω resistors R8 and R9 shown in FIG. 4A connected in series between the AC line and the thyristor's anode and a shunt using a small ceramic capacitor C5 across the thyristor.

At the one out of four ratio the power dissipation or loss will be calculated with the example of 40 mA current drain, the voltage drop over 270Ω will be 10.8V and power dissipation of 10.8V×0.04 A 4=0.108 W or only 108 mW. The 10.8V drop and an average power loss of 108 mW over a ¼ W resistor, which are of a minute significance, will not change much in the calculation discussed above, nor significantly the total performance of the AC adaptor or the power supply of the present invention, yet they will be sufficient to filter and shunt the small triggering noise to comply with the regulations such as the FCC or the CE.

FIG. 4A shows a controllable AC adaptor or power supply circuit, incorporating in addition to the conceptual power supplies circuits shown in FIGS. 3A, 3B and 3C a well known timer or a central processing unit (CPU) U1 and a well known photocoupler U2. The timer or the CPU U1 is connected via I/O port I/O1 through a resistor R6 for feeding the positive going zero crossing signal of the rectified AC pulse for synchronizing the timer or the CPU with the zero crossing or the start of the positive rectified AC pulse.

The line connecting R6 to the I/O1 port is not shown terminated, but it can be terminated by resistors network or diode for feeding the I/O1 port with zero crossing timing pulses having a level corresponding to a level as specified by the timer or the CPU U1 manufacturer. The I/O2 port operates as a driver output for switching on the LED inside the photocoupler U2 that switches on the photo transistor, or photo diode, inside the photocoupler. The photo transistor is a bypass device via its collector and emitter (or the photo diode anode and chatode) that are connected across the resistor R4 and the zener D2 thereby, when the photo transistor or diode is switched on it will bypass and directly connect the gate capacitor C2 to the gate terminal and will discharge the gate capacitor to trigger the thyristor.

By this circuit arrangement it is clear that the thyristor can be triggered via the discrete, non DC powered components, explained above and/or it can be triggered by the timer or the CPU U1 when the VCC power is stabilized and fed to the timer or the CPU, making the U1 functional.

The shown photocoupler U2 can be replaced for example by a well known FET switch with its gate being operated via the I/O2 port and its drain and source terminals are connected across R4 and D2, or it can be a transistor with a resistor and a diode between its base and I/O2.

With the ability to program or design a specific timer or CPU U1, it is clear that a precise, predetermined triggering time can be programmed for enabling any number of rectified AC pulses of the pulse train to pass through the thyristor T1 into the line F1, and moreover the timer or the CPU U1 can trigger the thyristor at any point along the fall time of the rectified AC pulse, such that the peak voltage of the outputted pulse will be lowered to a given level such as 30V or 50V, or as designed and pre-configured for the regulator of the AC adaptor or power supply, thereby improving the efficiency of the AC adaptor and reducing the waste and the heat.

However the triggering during the rise or the fall time, particularly during the peak of the rectified AC pulse causes sharp and large switching noise that must be suppressed, filtered and shunt. This was also explained above in connection with the shifting of the triggering position because of temperature variations or because of capacitance value change over long periods. The switching noise suppression, filtering and shunting in FIG. 4A uses two resistors R8 and R9 and the capacitor C5 as explained above. For small currents, up to 30 mA or 40 mA the resistors can be effectively used, however if the current is 50 mA or more it is simpler to use a coil and a capacitor such as the coil L1 and the capacitor C5 shown in FIG. 4B.

The R10 shown connecting the AC line to the diode D1 is a protection small value resistor such as 27Ω or similar. Commonly such an input resistor is a self destruct resistor known as fusible resistor, used for protection against direct shorts onto the power line to prevent fire and/or injury, otherwise the R10 is insignificant to the operation of the AC adaptor or power supply of the present invention.

Another resistor R7 is shown connecting the LED of the photocoupler U2 for providing a specific current to operate the LED of the photocoupler for feeding the trigger and switch on the thyristor. It should be clear that the shown noise filters R8, R9, C5 and L1 and/or the input resistor R10 and the LED resistor R7 are non exhaustive and are shown only as an example. Many different other modified circuits values and structure can replace or improve upon the shown circuits.

Further, the line F1 in FIG. 4A feeds the outputted whole or clipped rectified AC pulses, as triggered, via the current limiting diode CLD1. The input line to the thyristor of FIG. 4A includes resistors R8 and R9 for suppressing pulse clipping noises. This is because the current drain for the AC adaptor or power supply represented by FIG. 4A is for a low current such as up to 15 mA. Such small current can be easily handled through the feed of non clipped or slightly clipped rectified AC pulses through the CLD1 to the input capacitor C3.

In contrast the FIG. 4B shows the coil L1 for suppressing the triggering noise, while the F1 line feeds the input capacitor C3 through a resistor R5. The circuit in FIG. 4B fits higher current drain, such as 50 mA or more, providing that the rectified AC pulses are clipped at their fall time for limiting the high peak DC voltages. Moreover, for higher efficiency AC adaptor of the present invention it is better to employ a combination to include agate timing control for passing a given number of rectified AC pulses, i.e., control the passing rate of rectified AC pulses through the thyristor T1 and triggering the passing pulses during their fall time, such that the peak voltage is clipped to a pre-configured and designed lower voltage level.

Applying the combined control method such as outputting one out of two half wave rectified pulses and triggering the thyristor during the pulses fall time to clip the pulses, for example, to a peak of 30V enables the feeding of the clipped pulses via a small resistor R5 or directly to the input capacitor C3, with minor wasted energy.

When the timer U1 is operated in the US (60 Hz) in a fix pattern such as generating fixed trigger timing of 33.33 mSec., for outputting from the thyristor T1 one out of two half wave rectified AC pulse, or 41.66 mSec. for outputting one out of five full wave rectified AC pulses, for which the diode D1 of FIG. 5A or 5B can be replaced with the bridge rectifier B1 shown in FIG. 2B. In all cases of design consideration and pre-configuration the trigger timing via the capacitor C2, the resistors R3 and R4 and the zener diode D2 need to be calculated to a longer time than that of the programmed timer U1. This is to ensure that the timer U1 will override or take precedent and will always trigger the thyristor before the C2 is charged and ready to trigger and that C2 will never trigger on its own ahead of the timer U1, except during the initial time when the AC power is applied or restored.

The timer U1 is synchronized with the zero crossing signal fed via R6 and it can be predetermined and programmed to generate, for example, a trigger pulse delay of 27.5 mSec. for Europe (50 Hz). The delay starts therefore at the next positive going zero crossing (after the last trigger) for triggering the thyristor at the mid fall time of the next AC pulse (one out of two) of a half wave rectifier. As explained above the duration of half wave rectified AC pulse in a 50 Hz power line is 10 mSec. followed by an interval of 10 mSec., therefore a trigger generated by the timer U1 at 27.5 mSec. at the start of the next zero crossing will coincide with the mid of the fall time slope of the following next rectified AC pulse shown in FIG. 5A.

The same is applicable to the triggering of one out of three rectified pulses of a full wave rectifier circuit. A delay of 27.5 mSec. from the next zero crossing will trigger the thyristor at the mid of the fall time of the next, next full wave rectified pulse as shown in FIG. 5B.

From the above it becomes clear that the number of passing rectified AC pulses through the thyristor per unit of time such as per second, or the rate of the feed of rectified AC pulses, can be controlled via the gate capacitor circuit and/or via the timer circuit of the other preferred embodiment of the present invention.

From the above description it also becomes clear that the AC to DC power adaptor or power supply of the present invention can feed or pass a selected number of half wave or full wave AC rectified pulses via a thyristor T1 and via current limiting diode CLD1 and/or zener diode D3 and/or a resistor R5 to an input capacitor C3 of an analog voltage regulator REG1 for providing an efficient DC power with reduced power waste and lower heat dissipation for powering AC devices with a low voltage and low current drain. It also becomes clear that the timer U1 circuit of the present invention can trigger the passing rectified AC pulses at their fall time curve to reduce the peak voltage level and the current charges time into the input capacitor C3 of the voltage regulator REG1.

FIGS. 4A and 4B further show that a CPU U1 can replace the timer U1 for intelligently operating the AC to DC adaptor or power supply to dynamically follow the activity of a connected AC devices and be programmed to adjust the rate or the number of passing rectified AC pulses fed through the thyristor T1 and/or trigger the passing rectified AC pulses at varying time delay during the pulses fall time, for clipping the peak voltages level and/or the time duration the input capacitor C3 is charged.

The CPU U1 can be a well known CPU for operating as a timer only to replace the timer U1 or it can include more functions via its I/O3 port to receive data pertaining to the activity of the AC device to which the AC-DC adaptor or power supply is connected to or is installed into.

For example, when the AC device is a well known magnetic hall current sensor IC (not shown) for outputting data relating to current measurement or to the on-off status of an appliance, the I/O3 of the CPU1 is fed with data pertaining to the activity of the current sensor communication circuit, for which an increase in the DC current drain is in progress.

The CPUU1 is therefore programmed to change the trigger timing to increase the passing rate of the gated AC pulses through the thyristor to provide comulative current charges into C3 commensurate with the DC current increase.

The referenced US patents and US patent applications specifically the patent application Ser. Nos. 12/236,656, 12/725,808 and 12/761,484 disclosing devices that propagate optical signals via lightguide or fiber optic cables in home automation system. Such lightguides or fiber optic cables can be mingled with AC power lines and therefore it is proper to provide AC power line devices with optical communication receivers and transmitters for receiving and transmitting optical data. Such devices disclosed in the referenced patents and patent application are incorporated herein by reference.

There are well known CPUs for such AC devices connected to an optical receiver and optical transmitter and the current drain of such CPU circuit in a receiving mode will be less than 1.0 mA, while in transmitting mode the circuit current drain will rise to 10 mA or more. The transmission mode however lasts for example, a fraction of a second such as 300 mSec. and it operates at random times, such as once a day, or few times a day. Even in a repeated transmission mode the intervals between the transmissions will be of a second magnitude, such as 1 sec. or 3 sec. before resetting back to its receiving mode.

For such device it is preferable to design the overall circuit for a current drain of 1.0 mA, for which a slow rate of few clipped rectified AC pulses per second are fed to C3 via the CLD1 shown in FIG. 4A. C3 however can be a larger capacitor for accumulating sufficient electrical charge to cover the initial drain of the transmission mode. Yet, when the CPU U1 is by itself controlling the optical communication via two of its n number of I/O ports which are connected to an optical receiver such as photo transistor (not shown) and optical transmitter such as LED (not shown) for controlling the optical communication circuits, the CPU1 can command for example, the photocoupler U2 to change its trigger rate to a higher rate, such as feeding 30 clipped rectified AC pulses, or a full rate of 60 clipped half wave rectified AC pulses or at a rate of 120 full wave clipped rectified AC pulses, for the duration of the transmission mode, or slightly longer, to ensure that the electric charge in C3 is not depleted by the burst of optical transmission and/or by the repeated optical transmissions.

Such controlled AC to DC adaptor or power supply provide the most efficient, non wasteful, low cost solution to energy conservation, particularly when multiple AC devices for home automation system are installed in a single residence, that otherwise will consume higher electrical energy multiplied by the plurality of devices installed—for 24 hours a day, all year round.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method to control the feed rate of a rectified AC pulses in a low DC current power supply including a gated rectifier for outputting gated AC pulses via a charge line selected from a group comprising a current control diode, a zener diode, a transistor, a resistor and combinations thereof, to charge an input capacitor for buffering the feed to a DC voltage regulator connected via its input to said input capacitor;
   a gate capacitor for accumulating charges of said rectified AC pulses fed via a divider network selected from a group comprising at least one resistor, a diode, a zener diode and combinations thereof for triggering a gate terminal of said gated rectifier;
   wherein said charges into said gate capacitor are to time said triggering for passing said gated AC pulses through said gated rectifier to charge said input capacitor to a voltage level and a charge capacity commensurate with said voltage regulator and with said low DC current, said method comprising the steps of:
   a. applying said rectified AC pulses to the anode of said gated rectifier and via said divider network to said gate capacitor;
   b. charging incrementally said gate capacitor by a predetermined number of charges, each by one rectified AC pulse;
   c. discharging the aggregated charge including the last of said predetermined charge for triggering said gated rectifier;
   d. charging said input capacitor to said capacity at a rate of one gated AC pulse per said predetermined number; and
   e. powering a device consuming said low DC current via said voltage regulator.

2. The method to control the feed rate of a rectified AC pulses according to claim 1, wherein said device is selected from a group comprising bus line to optical converter, optical to bus line converter, optical controlled light switch, optical controlled dimmer, LED light dimmer, lightguide or fiber optic cable transceiver, lightguide or fiber optic cable transmitter, lightguide or fiber optic cable receiver, optical controller for air-condition, lightguide or fiber optic cable controller for air-condition, optical controller for electrical appliance, optical controller for A/V appliance, lightguide or fiber optic cable controller for electrical appliances, lightguide or fiber optic cable controller for A/V appliances, AC power outlet with lightguide port, AC power outlet with lightguide transceiver, AC power switch with lightguide port, AC power switch with lightguide transceiver, AC relay with lightguide port, AC relay with lightguide transceiver, curtain controller with lightguide port, curtain controller with lightguide transceiver, curtain controller with IR or RF control, power switch with IR or RF control, light switch with IR or RF control, dimmer with IR or RF control, IR control distributor, IR control relay, IR control buffer, lightguide distributor, optical signal distributor, home automation distributor and combinations thereof.

3. The method to control the feed rate of a rectified AC pulses according to claim 1, wherein said power supply includes a timer and a bypass trigger circuit selected from a group comprising a photocoupler, a FET, a transistor, a diode, a resistor and combinations thereof for overriding said control when said input capacitor is charged to said capacity;
   said timer is fed with a synchronizing zero crossing signal for driving said trigger circuit at a predetermined time delay for directly discharging said charge of said gate capacitor to said gate terminal via said trigger circuit, and wherein said time delay will drive said trigger circuit prior to said last charge and is set to coincide at one of a succeeding zero crossing or at a specific point during the fall time of said gated AC pulses.

4. The method to control the feed rate of a rectified AC pulses according to claim 1, wherein said power supply includes a CPU and a bypass trigger circuit selected from a group comprising a photocoupler, a FET, a transistor, a diode, a resistor and combinations thereof for overriding said control when said input capacitor is charged to said capacity;
   said CPU is fed with a synchronizing zero crossing signal for driving said trigger circuit at a predetermined time delay for directly discharging said charge of said gate capacitor to said gate terminal via said trigger circuit, and wherein said time delay will drive said trigger circuit prior to said last charge and is set to coincide at one of a succeeding zero crossing or at a specific point during the fall time of said gated AC pulses.

5. The method to control the feed rate of a rectified AC pulses according to claim 4, wherein said CPU adjusts said delay time commensurate with the drain of said DC current as per data fed from said device to said CPU pertaining to one of said DC current and to ongoing activity of said device.

6. The method to control the feed rate of a rectified AC pulses according to claim 5, wherein said device includes an optical transceiver for exchanging optical communications via one of lightguide and fiber optic cable and said data includes operating mode status, wherein the drain of said DC current in a transmitting mode is at said capacity and in a receiving mode is at a fraction of said capacity.

7. The method to control the feed rate of a rectified AC pulses according to claim 4, wherein said power supply is incorporated into said device and said CPU is the controller of said device and it is programmed to adjust said delay time commensurate with the device activities and the drain of said DC current.

8. The method to control the feed rate of a rectified AC pulses according to claim 7, wherein said device includes an optical transceiver for exchanging optical communications via one of lightguide and fiber optic cable and said CPU controls each of the optical transmitter and the optical receiver of said transceiver and simultaneously adjusts said delay time commensurate with the drain of said DC current during a receiving mode and during a transmitting mode.

9. The method to control the feed rate of a rectified AC pulses according to claim 8, wherein said device is an AC current sensor adaptor for exchanging said optical communications pertaining to the AC current drain by an AC current consuming product.

10. The method to control the feed rate of a rectified AC pulses according to claim 8, wherein said device is an AC outlet adaptor for exchanging said optical communications with an AC powered appliance via a power cable selected from a group comprising a power cable assembly incorporating lightguide, power cable incorporating a lightguide, a power cable assembly attached to a lightguide and a power cable attached to a lightguide.

11. An apparatus for controlling the feed rate of a rectified AC pulses applied to the anode of a gated rectifier in a low DC current power supply for outputting gated AC pulses via a charge line selected from a group comprising a current control diode, a zener diode, a transistor, a resistor and combinations thereof to charge an input capacitor for buffering the feed to a DC voltage regulator connected via its input to said input capacitor;
  a gate capacitor for accumulating incremental charges of said rectified AC pulses fed via a divider network selected from a group comprising at least one resistor, a diode, a zener diode and combinations thereof for triggering said gated rectifier, wherein said gate capacitor and said divider network are calculated to time said triggering by a predetermined number of said incremental charges and by discharging the aggregated charge including the last of said predetermined charge to the gate terminal of said gated rectifier; and
  said input capacitor charged by said gated AC pulses at a rate of one per said predetermined number, to a voltage level and a charge capacity commensurate with said voltage regulator and said DC low current, powers a device consuming said low DC current via said voltage regulator.

12. The apparatus for controlling the feed rate of a rectified AC pulses according to claim 11, wherein said device is selected from a group comprising bus line to optical converter, optical to bus line converter, optical controlled light switch, optical controlled dimmer, LED light dimmer, lightguide or fiber optic cable transceiver, lightguide or fiber optic cable transmitter, lightguide or fiber optic cable receiver, optical controller for air-condition, lightguide or fiber optic cable controller for air-condition, optical controller for electrical appliance, optical controller for A/V appliance, lightguide or fiber optic cable controller for electrical appliances, lightguide or fiber optic cable controller for A/V appliances, AC power outlet with lightguide port, AC power outlet with lightguide transceiver, AC power switch with lightguide port, AC power switch with lightguide transceiver, AC relay with lightguide port, AC relay with lightguide transceiver, curtain controller with lightguide port, curtain controller with lightguide transceiver, curtain controller with IR or RF control, power switch with IR or RF control, light switch with IR or RF control, dimmer with IR or RF control, IR control distributor, IR control relay, IR control buffer, lightguide distributor, optical signal distributor, home automation distributor and combinations thereof.

13. The apparatus for controlling the feed rate of a rectified AC pulses according to claim 11, wherein said power supply includes a timer and a bypass trigger circuit selected from a group comprising a photocoupler, a FET, a transistor, a diode, a resistor and combinations thereof for overriding said control when said input capacitor is charged to said capacity;
  said timer is fed with a synchronizing zero crossing signal for driving said trigger circuit at a calculated time delay for directly discharging said gate capacitor to said gated rectifier, and wherein said time delay will drive said trigger circuit prior to said last charge and is set to coincide at one of a succeeding zero crossing or at a specific point during the fall time of said gated AC pulses.

14. The apparatus for controlling the feed rate of a rectified AC pulses according to claim 11, wherein said power supply includes a CPU and a bypass trigger circuit selected from a group comprising a photocoupler, a FET, a transistor, a diode, a resistor and combinations thereof for overriding said control when said input capacitor is charged to said capacity;
  said CPU is fed with a synchronizing zero crossing signal for driving said trigger circuit at a calculated time delay for directly discharging said gate capacitor to said gated rectifier, and wherein said time delay will drive said trigger circuit prior to said last charge and is set to coincide at one of a succeeding zero crossing or at a specific point during the fall time of said gated AC pulses.

15. The apparatus for controlling the feed rate of a rectified AC pulses according to claim 14, wherein said CPU adjusts said delay time commensurate with the drain of said DC current as per data fed from said device to said CPU pertaining to one of said DC current and to ongoing activity of said device.

16. The apparatus for controlling the feed rate of a rectified AC pulses according to claim 15, wherein said device includes an optical transceiver for exchanging optical communications via one of lightguide and fiber optic cable and said data includes operating mode status, wherein the drain of said DC current in a transmitting mode is at said capacity and in a receiving mode is at a fraction of said capacity.

17. The apparatus for controlling the feed rate of a rectified AC pulses according to claim 14, wherein said power supply is incorporated into said device and said CPU is the controller of said device and it is programmed to adjust said delay time commensurate with the device activities and the drain of said DC current.

18. The apparatus for controlling the feed rate of a rectified AC pulses according to claim 17, wherein said device includes an optical transceiver for exchanging optical communications via one of lightguide and fiber optic cable and said CPU controls each of the optical transmitter and the optical receiver of said transceiver and simultaneously adjusts said delay time commensurate with the drain of said DC current during a receiving mode and during a transmitting mode.

19. The apparatus for controlling the feed rate of a rectified AC pulses according to claim 18, wherein said device is an AC current sensor adaptor for exchanging said optical communications pertaining to the AC current drain by an AC current consuming product.

20. The apparatus for controlling the feed rate of a rectified AC pulses according to claim 18, wherein said device is an AC outlet adaptor for exchanging said optical communications with an AC powered appliance via a power cable selected from a group comprising a power cable assembly incorporating lightguide, power cable incorporating a lightguide, a power cable assembly attached to a lightguide and a power cable attached to a lightguide.

* * * * *